US012810141B2

(12) United States Patent
Hoel et al.

(10) Patent No.: US 12,810,141 B2
(45) Date of Patent: Nov. 24, 2026

(54) MANAGING ALEATORIC AND EPISTEMIC UNCERTAINTY IN REINFORCEMENT LEARNING, WITH APPLICATIONS TO AUTONOMOUS VEHICLE CONTROL

(71) Applicant: VOLVO AUTONOMOUS SOLUTIONS AB, Gothenburg (SE)

(72) Inventors: Carl-Johan Hoel, Gothenburg (SE); Leo Laine, Härryda (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 1148 days.

(21) Appl. No.: 17/660,512

(22) Filed: Apr. 25, 2022

(65) Prior Publication Data

US 2022/0374705 A1 Nov. 24, 2022

(30) Foreign Application Priority Data

May 5, 2021 (EP) .................................... 21172327

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/214* (2023.01); *G06F 18/217* (2023.01); *G06N 3/04* (2013.01)

(58) Field of Classification Search
CPC .......... G06N 3/08; G06N 3/0895; G06N 3/09; G06N 3/091; G06N 3/092; G06N 3/094;
(Continued)

(56) References Cited

U.S. PATENT DOCUMENTS 11,124,204 B1 * 9/2021 Narang ................ G05B 13/027
2017/0278018 A1 * 9/2017 Mnih ....................... G06N 3/08
(Continued)

FOREIGN PATENT DOCUMENTS

WO 2019155061 A1 8/2019

OTHER PUBLICATIONS

Author: William R. Clements Title: Estimating Risk and Uncertainty in Deep Reinforcement Learning URL: https://arxiv.org/pdf/1905.09638 (Year: 2020).*

(Continued)

*Primary Examiner* — Erin M Piateski
*Assistant Examiner* — David Mesquiti Ovalle
(74) *Attorney, Agent, or Firm* — Jeffri A. Kaminski; Venable LLP

(57) ABSTRACT

Methods relating to the control of autonomous vehicles using a reinforcement learning agent include a plurality of training sessions, in which the agent interacts with an environment, each having a different initial value and yielding a state-action quantile function dependent on state and action. The methods further include a first uncertainty estimation on the basis of a variability measure, relating to a variability with respect to quantile $\tau$, of an average of the plurality of state-action quantile functions evaluated for a state-action pair; and a second uncertainty estimation on the basis of a variability measure, relating to an ensemble variability, for the plurality of state-action quantile functions evaluated for a state-action pair.

15 Claims, 5 Drawing Sheets

(51) Int. Cl.
*G06F 18/214* (2023.01)
*G06K 9/62* (2022.01)
*G06N 3/04* (2023.01)

(58) Field of Classification Search
CPC ...... G06N 3/096; G06N 3/098; G06N 3/0985; G06N 3/04; G06F 18/217; G06F 18/214
USPC .......................................................... 701/23
See application file for complete search history.

(56) References Cited

U.S. PATENT DOCUMENTS

| | | | | |
|---|---|---|---|---|
| 2019/0278282 | A1* | 9/2019 | Palanisamy | G05D 1/0221 |
| 2020/0150672 | A1 | 5/2020 | Naghshvar et al. | |
| 2020/0226430 | A1* | 7/2020 | Ahuja | G06N 3/084 |
| 2020/0364557 | A1* | 11/2020 | Ostrovski | G06N 3/04 |
| 2020/0372410 | A1* | 11/2020 | Karaletsos | G06N 20/00 |
| 2021/0073912 | A1* | 3/2021 | Da Silva | G06N 3/045 |
| 2022/0027708 | A1* | 1/2022 | Mori | G06N 3/08 |
| 2022/0055689 | A1* | 2/2022 | Mandlekar | B60W 60/0025 |

OTHER PUBLICATIONS

Author: Carl-Johan Hoel Title: Tactical Decision-Making in Autonomous Driving by Reinforcement Learning with Uncertainty Estimation URL: https://arxiv.org/pdf/2004.10439 (Year: 2020).*

Author: Mahdi Molaie Title: Auto-Driving Policies in Highway based on Distributional Deep Reinforcement Learning URL: https://ieeexplore.ieee.org/document/9483545?source=IQplus (Year: 2021).*

Author: Will Dabney URL: https://arxiv.org/pdf/1806.06923 (Year: 2018).*

Author: Carl-Johan Hoel URL: https://arxiv.org/pdf/2105.10266v1 (Year: 2021).*

Author: Yuandu Lai URL: https://arxiv.org/pdf/2104.12953 (Year: 2021).*

William R Clements et al: "Estimating Risk and Uncertainty in Deep Reinforcement Learning", arxiv.org, Cornell University Library, 201 Olin Library Cornell University Ithaca, NY 14853, May 23, 2019 (May 23, 2019), XP081515375, * Sections 2-4.3.1, Annexes A and F *.

Hoel Carl-Johan et al.: "Tactical Decision-Making in Autonomous Driving by Reinforcement Learning with Uncertainty Estimation", 2020 IEEE Intelligent Vehicles Symposium (IV), Oct. 19, 2020 (Oct. 19, 2020), pp. 1563-1569, XP033873179, DOI: 10.1109/IV47402.2020.9304614 [retrieved on Dec. 22, 2020] * Sections II and III*.

Moskovitz Ted et al: "Deep Reinforcement Learning with Dynamic Optimism", Feb. 9, 2021 (Feb. 9, 2021), XP055863813, Retrieved from the Internet: URL:https://arxiv.org/pdf/2102.03765v2.pdf [retrieved on Nov. 21, 2021] Section 5 *.

Youngseog Chung et al: "Beyond Pinball Loss: Quantile Methods for Calibrated Uncertainty Quantification", arxiv.org, Cornell University Library, 201 Olin Library Cornell University Ithaca, NY 14853, Dec. 5, 2020 (Dec. 5, 2020), XP081829722, * Annex D *.

Will Dabney et al: "Implicit Quantile Networks for Distributional Reinforcement Learning", arxiv.org, Cornell University Library, 201 Olin Library Cornell University Ithaca, NY 14853, Jun. 14, 2018 (Jun. 14, 2018), XP080891965, * the whole document*.

European Search Report dated Dec. 2, 2021 in corresponding European Patent Application No. 21172327.5, 10 pages.

William R Clements et al: "Estimating Risk and Uncertainty in Deep Reinforcement Learning", Sep. 9, 2020 (Sep. 9, 2020), 12 pages.

* cited by examiner

MANAGING ALEATORIC AND EPISTEMIC UNCERTAINTY IN REINFORCEMENT LEARNING, WITH APPLICATIONS TO AUTONOMOUS VEHICLE CONTROL

TECHNICAL FIELD

The present disclosure relates to the field of autonomous vehicles. In particular, it describes methods and devices for providing a reinforcement learning agent and for controlling an autonomous vehicle using the reinforcement learning agent.

BACKGROUND

The decision-making task for an autonomous vehicle is commonly divided into strategic, tactical, and operational decision-making, also called navigation, guidance and stabilization. In short, tactical decisions refer to high-level, often discrete, decisions, such as when to change lanes on a highway, or whether to stop or go at an intersection. This invention primarily targets the tactical decision-making field.

Reinforcement learning (RL) is being applied to decision-making for autonomous driving. The agents that were trained by RL in early works could only be expected to output rational decisions in situations that were close to the training distribution. Indeed, a fundamental problem with these methods was that no matter what situation the agents were facing, they would always output a decision, with no suggestion or indication about the uncertainty of the decision or whether the agent had experienced anything similar during its training. If, for example, an agent previously trained for one-way highway driving was deployed in a scenario with oncoming traffic, it would still produce decisions, without any warning that these were presumably of a much lower quality. A more subtle case of insufficient training is one where the agent has been exposed to a nominal or normal highway driving environment and suddenly faces a speeding driver or an accident that creates standstill traffic.

Uncertainty can be classified into the categories aleatoric and epistemic uncertainty, and many decision-making problems require consideration of both. The two highway examples illustrate epistemic uncertainty. The present inventors have proposed methods for managing this type of uncertainty, see C. J. Hoel, K. Wolff and L. Laine, "Tactical decision-making in autonomous driving by reinforcement learning with uncertainty estimation", *IEEE Intel. Veh. Symp.* (*IV*), 2020, pp. 1563-1569. See also PCT/EP2020/061006. According to these proposed methods, an ensemble of neural networks with additive random prior functions is used to obtain a posterior distribution over the expected return. One use of this distribution is to estimate the uncertainty of a decision. Another use is to direct further training of an RL agent to the situations in most need thereof. With tools of this kind, developers can reduce the expenditure on precautions such as real-world testing in a controlled environment, during which the decision-making agent is successively refined until it is seen to produce an acceptably low level of observed errors. Such conventionally practiced testing is onerous, time-consuming and drains resources from other aspects of research and development.

Aleatoric uncertainty, by contrast, refers to the inherent randomness of an outcome and can therefore not be reduced by observing more data. For example, when approaching an occluded intersection, there is an aleatoric uncertainty in whether, or when, another vehicle will enter the intersection. Estimating the aleatoric uncertainty is important since such information can be used to make risk-aware decisions. An approach to estimating the aleatoric uncertainty associated with a single trained neural network is presented in W. R. Clements et al., "Estimating Risk and Uncertainty in Deep Reinforcement Learning", arXiv:1905.09638 [cs.LG]. This paper applies theoretical concepts originally proposed by W. Dabney et al. in "Distributional reinforcement learning with quantile regression", *AAAI Conference on Artificial Intelligence,* 2018 (preprint arXiv:1707.06887 [cs.LG]) and in "Implicit quantile networks for distributional reinforcement learning", *Int. Conf. on Machine Learning,* 2018, pp. 1096-1105; see also WO2019155061A1. Clements and coauthors represent the aleatoric uncertainty as the variance of the expected value of the quantiles according to the neural network weights θ.

On this background, it would be desirable to enable a complete uncertainty estimate, including both the aleatoric and epistemic uncertainty, for a trained RL agent and its decisions.

SUMMARY

One objective of the present invention is to make available methods and devices for assessing the aleatoric and epistemic uncertainty of outputs of a decision-making agent, such as an RL agent. A particular objective is to provide methods and devices by which the decision-making agent does not just output a recommended decision, but also estimates an aleatoric and epistemic uncertainty of this decision. Such methods and devices may preferably include a safety criterion that determines whether the trained decision-making agent is confident enough about a particular decision, so that—in the negative case—the agent can be overridden by a safety-oriented fallback decision. A further objective of the present invention is to make available methods and devices for assessing, based on aleatoric and epistemic uncertainty, the need for additional training of a decision-making agent, such as an RL agent. A particular objective is to provide methods and devices determining the situations which the additional training of decision-making agent should focus on. Such methods and devices may preferably include a criterion—similar to the safety criterion above—that determines whether the trained decision-making agent is confident enough about a given state-action pair (corresponding to a possible decision) or about a given state, so that—in the negative case—the agent can be given additional training aimed at this situation.

At least some of these objectives are achieved by the invention as defined by the independent claims. The dependent claims relate to embodiments of the invention.

In a first aspect of the invention, there is provided a method of controlling an autonomous vehicle, as defined in claim 1. Rather than concatenating the previously known techniques for estimating only aleatoric uncertainty and only epistemic uncertainty straightforwardly, this method utilizes a unified computational framework where both types of uncertainties can be derived from the K state-action quantile functions $k_{k,\tau}(s, a)$ which result from the K training sessions. Each function $k_{k,\tau}(s, a)$ refers to the quantiles of the distribution over returns. The use of a unified framework is likely to eliminate irreconcilable results of the type that could occur if, for example, an IQN-based estimation of the aleatoric uncertainty was run in parallel to an ensemble-based estimation of the epistemic uncertainty. When execution of the tentative decision to perform action â in state ŝ is made dependent on the uncertainty—wherein possible outcomes may be non-execution, execution with additional safety-oriented restrictions, or reliance on a backup policy—a desired safety level can be achieved and maintained.

Independent protection for an arrangement suitable for performing this method is claimed.

In a second aspect of the invention, there is provided a method of providing an RL agent for decision-making to be used in controlling an autonomous vehicle. The second aspect of the invention relies on the same unified computational framework as the first aspect. The utility of this method is based on the realization that epistemic uncertainty (second uncertainty estimation) can be reduced by further training. If the second uncertainty estimation produces a relatively higher value for one or more state-action pairs, then further training may be directed at those state-action pairs. This makes it possible to provide an RL agent with a desired safety level in shorter time. In implementations, the respective outcomes of the first and second uncertainty estimations may not be accessible separately; for example, only the sum $\mathrm{Var}_\tau[\mathbb{E}_k[Z_{k,\tau}(s, a)]]+\mathrm{Var}_k[\mathbb{E}_\tau[Z_{k,\tau}(s, a)]]$ may be known, or only the fact the two estimations have passed a threshold criterion. Then, even though an increased value of the sum or a failing of the threshold criterion may be due to the contribution of the aleatoric uncertainty alone, it may be rational in practical situations to nevertheless direct further training to the state-action pair(s) in question, to explore whether the uncertainty can be reduced. The option of training the agent in a uniform, indiscriminate manner may be less efficient on the whole.

Independent protection for an arrangement suitable for performing the method of the second aspect is claimed as well.

It is noted that the first and second aspects have in common that an ensemble of multiple neural networks are used, from which each network learns a state-action quantile function corresponding to a sought optimal policy. It is from the variability within the ensemble and the variability with respect to the quantile that the epistemic and aleatoric uncertainties can be estimated. Without departing from the invention, one may alternatively use a network architecture where a common initial network is divided into K branches with different weights, which then provide K outputs equivalent to the outputs of an ensemble of K neural networks. A still further option is to use one neural network that learns a distribution over weights; after the training phase, the weights are sampled K times.

The invention further relates to a computer program containing instructions for causing a computer, or an autonomous vehicle control arrangement in particular, to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of the magnetic, optical or solid-state type. Still within the scope of "data carrier", such memories may be fixedly mounted or portable.

As used herein, an "RL agent" may be understood as software instructions implementing a mapping from a state s to an action a. The term "environment" refers to a simulated or real-world environment, in which the autonomous vehicle—or its model/avatar in the case of a simulated environment—operates. A mathematical model of the RL agent's interaction with an "environment" in this sense is given below. A "variability measure" includes any suitable measure for quantifying statistic dispersion, such as a variance, a range of variation, a deviation, a variation coefficient, an entropy etc. A "state-action quantile function" refers to the quantiles of the distribution over returns $R_t$ for a policy. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

Figure 1:
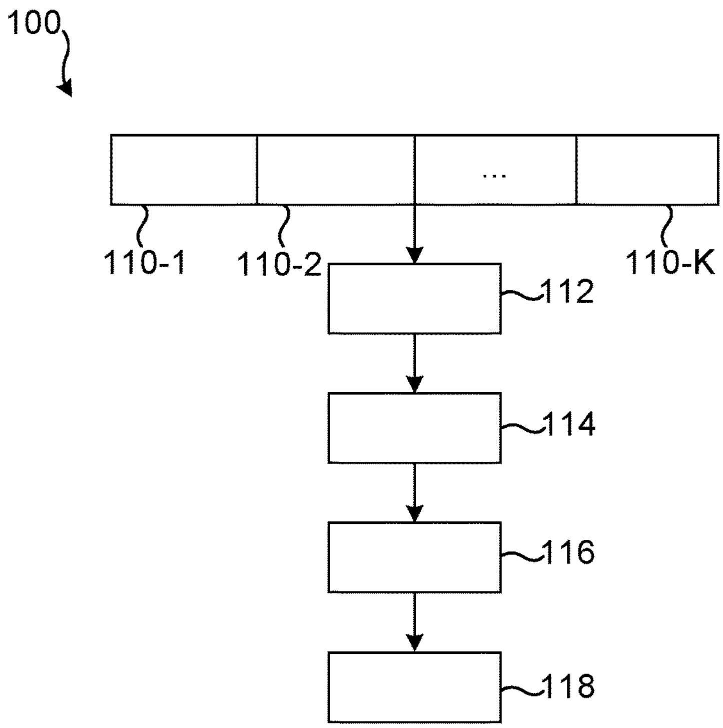
FIGS. 1 and 2 are flowcharts of two methods according to embodiments of the invention.

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Theoretical Concepts

Reinforcement learning (RL) is a branch of machine learning, where an agent interacts with some environment to learn a policy $\pi(s)$ that maximizes the future expected return. Reference is made to the textbook R. S. Sutton and A. G. Barto, *Reinforcement Learning: An Introduction,* $2^{nd}$ ed., MIT Press (2018).

The policy $\pi(s)$ defines which action a to take in each state s. When an action is taken, the environment transitions to a new state s' and the agent receives a reward r. The decision-making problem that the RL agent tries to solve can be modeled as a Markov decision process (MDP), which is defined by the tuple $(\mathcal{S}; \mathcal{A}; T; R; \gamma)$, where $\mathcal{S}$ is the state space, $\mathcal{A}$ is the action space, T is a state transition model (or evolution operator), R is a reward model, and $\gamma$ is a discount factor. The goal of the RL agent is to maximize expected future return $\mathbb{E}[R_t]$, for every time step t, where $$R_t = \sum_{k=0}^{\infty} \gamma^k r_{t+k}.$$

The value of taking action a in state s and then following policy $\pi$ is defined by the state-action value function $$Q^\pi(s, a) = \mathbb{E}[R_t | s_t = s, a_t = a, \pi].$$

In Q-learning, the agent tries to learn the optimal state-action value function, which is defined as $$Q^*(s, a) = \max_\pi Q^\pi(s, a),$$

and the optimal policy is derived from the optimal action-value function using the relation $$\pi^*(s) = \operatorname{argmax}_a Q^*(s, a).$$

In contrast to Q-learning, distributional RL aims to learn not only the expected return but also the distribution over returns. This distribution is represented by the random variable $$Z^\pi(s, a) = R_t \text{ given } s_t = s, a_t = a \text{ and policy } \pi.$$

The mean of this random variable is the classical state-action value function, i.e., $Q^\pi(s, a) = \mathbb{E}[Z^\pi(s, a)]$. The distribution over returns represents the aleatoric uncertainty of the outcome, which can be used to estimate the risk in different situations and to train an agent in a risk-sensitive manner.

The random variable $Z^\pi$ has a cumulative distribution function $F_{Z^\pi}(z)$, whose inverse is referred to as quantile function and may be denoted simply as $Z_\tau$=

$$Z_\tau = F_{Z^\pi}^{-1}(\tau),\ 0 \le \tau \le 1.$$

$0 \le \tau \le 1$. For $\tau \sim \mathcal{U}(0,1)$, the sample $Z_\tau(s, a)$ has the probability distribution of $Z^\pi(s, a)$, that is, $Z_\tau(s, a) \sim Z^\pi(s, a)$.

The present invention's approach, termed Ensemble Quantile Networks (EQN) method, enables a full uncertainty estimate covering both the aleatoric and the epistemic uncertainty. An agent that is trained by EQN can then take actions that consider both the inherent uncertainty of the outcome and the model uncertainty in each situation.

The EQN method uses an ensemble of neural networks, where each ensemble member individually estimates the distribution over returns. This is related to the implicit quantile network (IQN) framework; reference is made to the above-cited works by Dabney and coauthors. The $k^{th}$ ensemble member provides:

$$Z_{k,\tau}(s,a) = f_\tau(s,a;\theta_k) + \beta p_\tau(s,a;\hat{\theta}_k),$$

where $f_\tau$ and $p_\tau$ are neural networks with identical architecture, $\theta_k$ are trainable network parameters (weights), whereas $\hat{\theta}_k$ denotes fixed network parameters. The second term may be a randomized prior function (RPF), as described in I. Osband, J. Aslanides and A. Cassirer, "Randomized prior functions for deep reinforcement learning," in: S. Bengjo et al. (eds.), *Adv. in Neural Inf. Process. Syst.* 31 (2018), pp. 8617-8629. The factor $\beta$ can be used to tune the importance of the RPF. The temporal difference (TD) error of ensemble member k and two quantile samples $\tau, \tau' \sim \mathcal{U}(0,1)$ is $$\delta_{k,t}^{\tau,\tau'} = r_t + \gamma Z_{k,\tau'}(s_{t+1}, \tilde{\pi}(s_{t+1})) - Z_{k,t}(s_t, a_t),$$

where $$\tilde{\pi}(s) = \operatorname{argmax}_a \frac{1}{K_\tau} \sum_{j=1}^{K_\tau} Z_{\tilde{\tau}_j}(s, a)$$

is a sample-based estimate of the optimal policy using $\tilde{\tau}_j \sim \mathcal{U}(0,1)$ and $K_\tau$ is a positive integer.

Quantile regression is used. The regression loss, with threshold $\kappa$, is calculated as $$\rho_{\tau_i}^{\kappa}\left(\delta_{k,t}^{\tau_i,\tau_j'}\right) = \left|\tau - \mathbb{1}\left\{\delta_{k,t}^{\tau_i,\tau_j'} < 0\right\}\right| \delta_{k,t}^{\tau_i,\tau_j'}.$$

The full loss function is obtained from a mini-batch M of sampled experiences, in which the quantiles $\tau$ and $\tau'$ are sampled N and N' times, respectively, according to:

$$L_{EQN}(\theta_k) = \mathbb{E}_M\left[\frac{1}{N'} \sum_{i=1}^{N} \sum_{j=1}^{N'} \rho_{\tau_i}^{\kappa}\left(\delta_{k,t}^{\tau_i,\tau_j'}\right)\right]$$

For each new training episode, the agent follows the policy $\tilde{\pi}_v(s)$ of a randomly selected ensemble member v.

An advantageous option is to use quantile Huber regression loss, which is given by $$\rho_{\tau_i}^{\kappa}\left(\delta_{k,t}^{\tau_i,\tau_j'}\right) = \left|\tau - \mathbb{1}\left\{\delta_{k,t}^{\tau_i,\tau_j'} < 0\right\}\right| \frac{\mathcal{L}_\kappa\left(\delta_{k,t}^{\tau_i,\tau_j'}\right)}{\kappa}.$$

Here, the Huber loss is defined as $$\mathcal{L}_\kappa\left(\delta_{k,t}^{\tau_i,\tau_j'}\right) = \begin{cases} \frac{1}{2}\left(\delta_{k,t}^{\tau_i,\tau_j'}\right)^2 & \text{if } \left|\delta_{k,t}^{\tau_i,\tau_j'}\right| \le \kappa, \\ \kappa\left(\left|\delta_{k,t}^{\tau_i,\tau_j'}\right| - \frac{1}{2}\kappa\right) & \text{otherwise,} \end{cases}$$

which ensures a smooth gradient as $$\delta_{k,t}^{\tau,\tau'} \to 0.$$

The full training process of the EQN agent that was used in this implementation may be represented in pseudo-code as follows:

Algorithm 3 EQN training process

```
1: for k ← 1 to K
2:     Initialize θ_k and θ̂_k randomly
```

-continued

Algorithm 3 EQN training process $m_k \leftarrow \{\ \}$
$t \leftarrow 0$
while networks not converged
  $s_t \leftarrow$ initial random state
  $v \sim \mathcal{U}\{1,K\}$
  while episode not finished
    $\tau_1, \ldots, \tau_{K_\tau} \overset{i.i.d.}{\sim} \mathcal{U}(0, \alpha)$
    $a_t \leftarrow \arg\max_a \frac{1}{K_\tau}\sum_{k=1}^{K_\tau} Z_{v,\tau_k}(s_t, a)$
    $s_{t+1}, r_t \leftarrow$ STEPENVIRONMENT($s_t$, $a_t$)
    for k ← 1 to K
      if $p \sim \mathcal{U}(0, 1) < p_{add}$
        $m_k \leftarrow m_k \cup \{(s_t, a_t, r_t, s_{t+1})\}$
      $M \leftarrow$ sample from $m_k$
      update $\theta_k$ with SGD and loss $L_{EQN}(\theta_k)$
    $t \leftarrow t + 1$ In the pseudo-code, the function StepEnvironment corresponds to a combination of the reward model R and state transition model T discussed above. The notation $v \sim \mathcal{U}\{1, K\}$ refers to sampling of an integer v from a uniform distribution over the integer range [1, K], and $\tau \sim \mathcal{U}(0, \alpha)$ denotes sampling of a real number from a uniform distribution over the open interval (0, α). SGD is short for stochastic gradient descent and i.i.d. means independent and identically distributed.

The EQN agent allows an estimation of both the aleatoric and epistemic uncertainties, based on a variability measure of the returns, $\mathrm{Var}_\tau[\mathbb{E}_k[Z_{k,\tau}(s, a)]]$, and a variability measure of an expected value of returns, $\mathrm{Var}_k[\mathbb{E}_\tau[Z_{k,\tau}(s, a)]]$. Here, the variability measure Var[·] may be a variance, a range, a deviation, a variation coefficient, an entropy or combinations of these. An index of the variability measure is used to distinguish variability with respect to the quantile ($\mathrm{Var}_\tau[\cdot]$, $0 \le \tau \le 1$) from variability across ensemble members ($\mathrm{Var}_k[\cdot]$, $1 \le k \le K$). Further, the sampled expected value operator $\mathbb{E}_{\tau_\sigma}$ may be defined as $$\mathbb{E}_{\tau_\sigma}[Z_{k,\tau}(s, a)] = \frac{1}{K_\tau}\sum_{\tau \in \tau_\sigma} Z_{k,\tau}(s, a),$$

$$\text{where } \tau_\sigma = \left\{\frac{i}{K_\tau} : i \in [1, K_\tau]\right\}$$

and $K_\tau$ is a positive integer. After training of the neural networks, for the reasons presented above, it holds that $Z_{k,\tau}(s, a) \sim Z^\pi(s, a)$ for each k. It follows that $$\mathbb{E}_{\tau_\sigma}[Z_{k,\tau}(s, a)] \approx \mathbb{E}[Z^\pi(s, a)] = Q^\pi(s, a),$$

wherein the approximation may be expected to improve as $K_\tau$ increases.

On this basis, the trained agent may be configured to follow the following policy:

$$\pi_{\sigma_a,\sigma_e}(s) = \begin{cases} \underset{a}{\mathrm{argmax}}\,\mathbb{E}_k\left[\mathbb{E}_{\tau_\sigma}[Z_{k,\tau}(s, a)]\right] & \text{if confident,} \\ \pi_{backup}(s) & \text{otherwise,} \end{cases}$$

where $\pi_{backup}(s)$ is a decision by a fallback policy or backup policy, which represents safe behavior. The agent is deemed to be confident about a decision (s, a) if both $$\mathrm{Var}_\tau[\mathbb{E}_k[Z_{k,\tau}(s, a)]] < \sigma_a^2 \text{ and}$$

$$\mathrm{Var}_k[\mathbb{E}_\tau[Z_{k,\tau}(s, a)]] < \sigma_e^2,$$

where $\sigma_a$, $\sigma_e$ are constants reflecting the tolerable aleatoric and epistemic uncertainty, respectively.

For computational simplicity, the first part of the confidence condition can be approximated by replacing the quantile variability $\mathrm{Var}_\tau$ with an approximate variability measure $\mathrm{Var}_{\tau_\sigma}$ which is based on samples taken for the set $\tau_\sigma$ of points in the real interval [0,1]. Here, the sampling points in $\tau_\sigma$ may be uniformly spaced, as defined above, or non-uniformly spaced. Alternatively or additionally, the second part of the confidence condition can be approximated by replacing the expected value $\mathbb{E}_\tau$ with the sampled expected value $\mathbb{E}_{\tau_\sigma}$ defined above.

Implementations

The presented algorithms for estimating the aleatoric or epistemic uncertainty of an agent have been tested in simulated traffic intersection scenarios. However, these algorithms provide a general approach and could be applied to any type of driving scenarios. This section describes how a test scenario is set up, the MDP formulation of the decision-making problem, the design of the neural network architecture, and the details of the training process.

Simulation setup. An occluded intersection scenario was used. The scenario includes dense traffic and is used to compare the different algorithms, both qualitatively and quantitatively. The scenario was parameterized to create complicated traffic situations, where an optimal policy has to consider both the occlusions and the intentions of the other vehicles, sometimes drive through the intersection at a high speed, and sometimes wait at the intersection for an extended period of time.

The Simulation of Urban Mobility (SUMO) was used to run the simulations. The controlled ego vehicle, a 12 m long truck, aims to pass the intersection, within which it must yield to the crossing traffic. In each episode, the ego vehicle is inserted 200 m south from the intersection, and with a desired speed $v_{set}$=15 m/s. Passenger cars are randomly inserted into the simulation from the east and west end of the road network with an average flow of 0.5 vehicles per second. The cars intend to either cross the intersection or turn right. The desired speeds of the cars are uniformly distributed in the range $[v_{min}, v_{max}]$=[10, 15] m/s, and the longitudinal speed is controlled by the standard SUMO speed controller (which is a type of adaptive cruise controller, based on the Intelligent Driver Model (IDM)) with the exception that the cars ignore the presence of the ego vehicle. Normally, the crossing cars would brake to avoid a collision with the ego vehicle, even when the ego vehicle violates the traffic rules and does not yield. With this exception, however, more collisions occur, which gives a more distinct quantitative difference between different policies. Each episode is terminated when the ego vehicle has passed the intersection, when a collision occurs, or after $N_{max}$=100 simulation steps. The simulations use a step size of Δt=1 s.

It is noted that the setup of this scenario includes two important sources of randomness in the outcome for a given policy, which the aleatoric uncertainty estimation should capture. From the viewpoint of the ego vehicle, a crossing vehicle can appear at any time until the ego vehicle is sufficiently close to the intersection, due to the occlusions. Furthermore, there is uncertainty in the underlying driver state of the other vehicles, most importantly in the intention of going straight or turning to the right, but also in the desired speed.

Epistemic uncertainty is introduced by a separate test, in which the trained agent faces situations outside of the training distribution. In these test episodes, the maximum speed $v_{max}$ of the surrounding vehicles are gradually increased from 15 m/s (which is included in the training episodes) to 25 m/s. To exclude effects of aleatoric uncertainty in this test, the ego vehicle starts in the non-occluded region close to the intersection, with a speed of 7 m/s.

MDP formulation. The following Markov decision process (MDP) describes the decision-making problem.

State space, $\mathcal{S}$: The state of the system, $$s=(\{x_i, y_i, v_i, \psi_i\}: 0 \le i \le N_{veh}),$$

consists of the position $x_i$, $y_i$, longitudinal speed $v_i$, and heading $\psi_i$ of each vehicle, where index 0 refers to the ego vehicle. The agent that controls the ego vehicle can observe other vehicles within the sensor range $x_{sensor}$=200 m, unless they are occluded.

Action space, $\mathcal{A}$: At every time step, the agent can choose between three high-level actions: 'stop', 'cruise', and 'go', which are translated into accelerations through the IDM. The action 'go' makes the IDM control the speed towards $v_{set}$ by treating the situation as if there are no preceding vehicles, whereas 'cruise' simply keeps the current speed. The action 'stop' places an imaginary target vehicle just before the intersection, which causes the IDM to slow down and stop at the stop line. If the ego vehicle has already passed the stop line, 'stop' is interpreted as maximum braking. Finally, the output of the IDM is limited to $[a_{min}, a_{max}]=[-3, 1]$ m/s$^2$. The agent takes a new decision at every time step $\Delta t$ and can therefore switch between, e.g., 'stop' and 'go' multiple times during an episode.

Reward model, R: The objective of the agent is to drive through the intersection in a time efficient way, without colliding with other vehicles. A simple reward model is used to achieve this objective. The agent receives a positive reward $r_{goal}$=10 when the ego vehicle manages to cross the intersection and a negative reward $r_{col}$=−10 if a collision occurs. If the ego vehicle gets closer to another vehicle than 2.5 m longitudinally or 1 m laterally, a negative reward $r_{near}$=−10 is given, but the episode is not terminated. At all other time steps, the agent receives a zero reward.

Transition model, T: The state transition probabilities are not known by the agent. They are implicitly defined by the simulation model described above.

Backup policy. A simple backup policy $\pi_{backup}(s)$ is used together with the uncertainty criteria. This policy selects the action 'stop' if the vehicle is able to stop before the intersection, considering the braking limit $a_{min}$. Otherwise, the backup policy selects the action that is recommended by the agent. If the backup policy always consisted of 'stop', the ego vehicle could end up standing still in the intersection and thereby cause more collisions. Naturally, more advanced backup policies would be considered in a real-world implementation.

Figure 5:
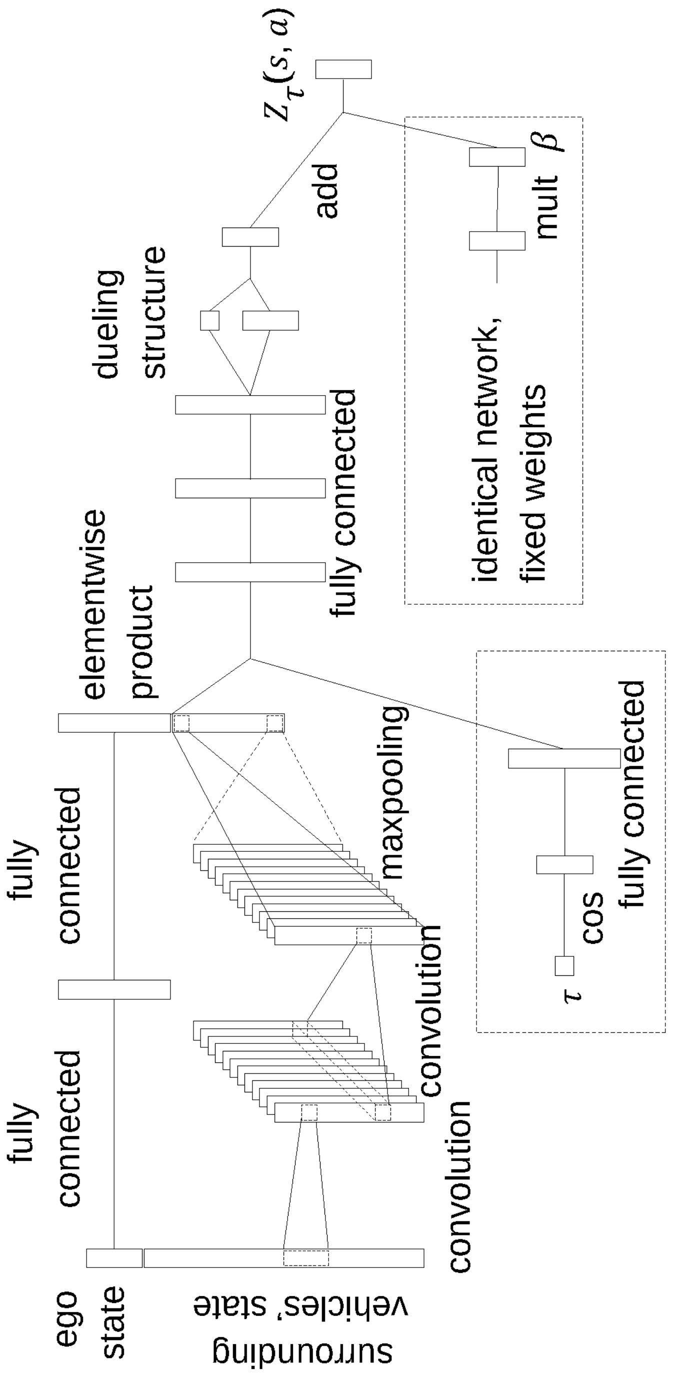
FIG. 5 is an example neural network architecture of an Ensemble Quantile Network (EQN) algorithm.

Neural network architecture. FIG. 5 shows the neural network architecture that is used in this example implementation. The size and stride of the first convolutional layers are set to four, which is equal to the number of states that describe each surrounding vehicle, whereas the second convolutional layer has a size and stride of one. Both convolutional layers have 256 filters each, and all fully connected layers have 256 units. Finally, a dueling structure, which separates the estimation of the value of a state and the advantage of an action, outputs $Z_\tau(s, a)$. All layers use rectified linear units (ReLUs) as activation functions, except for the dueling structure which has a linear activation function. Before the state s is fed to the network, each entry is normalized to the range [−1,1].

At the low left part of the network, an input for the sample quantile $\tau$ is seen. An embedding from $\tau$ is created by setting $\phi(\tau)=(\phi_1(\tau), \ldots, \phi_{64}(\tau))$, where $\phi_j(\tau)=\cos \pi j \tau$, and then passing $\phi(\tau)$ through a fully connected layer with 512 units. The output of the embedding is then merged with the output of the concatenating layer as the element-wise (or Hadamard) product.

At the right side of the network in FIG. 5, the additive combination of the variable-weight and fixed-weight (RPF) contributions, after the latter have been scaled by $\beta$, of course corresponds to the linear combination $f_\tau(s, a; \theta_k)+\beta p_\tau(s, a; \hat{\theta}_k)$ which appeared in the previous section.

Training process. Algorithm 3 was used to train the EQN agent. As mentioned above, an episode is terminated due to a timeout after maximally $N_{max}$ steps, since otherwise the current policy could make the ego vehicle stop at the intersection indefinitely. However, since the time is not part of the state space, a timeout terminating state is not described by the MDP. Therefore, in order to make the agents act as if the episodes have no time limit, the last experience of a timeout episode is not added to the experience replay buffer. Values of the hyperparameters used for the training are shown in Table 1.

TABLE 1

| Hyperparameters | |
|---|---|
| Number of quantile samples N, N', $K_\tau$ | 32 |
| Number of ensemble members K | 10 |
| Prior scale factor $\beta$ | 300 |
| Experience adding probability $p_{add}$ | 0.5 |
| Discount factor $\gamma$ | 0.95 |
| Learning start iteration $N_{start}$ | 50,000 |
| Replay memory size $N_{replay}$ | 500,000 |
| Learning rate $\eta$ | 0.0005 |
| Mini-batch size \|M\| | 32 |
| Target network update frequency $N_{update}$ | 20,000 |
| Huber loss threshold $\kappa$ | 10 |
| Initial exploration parameter $\epsilon_0$ | 1 |
| Final exploration parameter $\epsilon_1$ | 0.05 |
| Final exploration iteration $N_\epsilon$ | 500,000 |

The training was performed for 3,000,000 training steps, at which point the agents' policies have converged, and then the trained agents are tested on 1,000 test episodes. The test episodes are generated in the same way as the training episodes, but they are not present during the training phase.

Results. The performance of the EQN agent has been evaluated within the training distribution, results of being presented in Table 2.

TABLE 2

| Dense traffic scenario, tested within training distribution | | | |
|---|---|---|---|
| | thresholds | collisions (%) | crossing time (s) |
| EQN with | $\sigma_a=\infty$ | 0.9 ± 0.1 | 32.0 ± 0.2 |
| K = 10 and | $\sigma_a=3.0$ | 0.6 ± 0.2 | 33.8 ± 0.3 |
| $\beta$ = 300 | $\sigma_a=2.0$ | 0.5 ± 0.1 | 38.4 ± 0.5 |

TABLE 2-continued

| Dense traffic scenario, tested within training distribution | | |
|---|---|---|
| thresholds | collisions (%) | crossing time (s) |
| $\sigma_a = 1.5$ | 0.3 ± 0.1 | 47.2 ± 1.2 |
| $\sigma_a = 1.0$ | 0.0 ± 0.0 | 71.1 ± 1.9 |
| $\sigma_a = 1.5$, $\sigma_e = 1.0$ | 0.0 ± 0.0 | 48.9 ± 1.6 |

The EQN agent appears to unite the advantages of agents that consider only aleatoric or only epistemic uncertainty, and it can estimate both the aleatoric and epistemic uncertainty of a decision. When the aleatoric uncertainty criterion is applied, the number of situations that are classified as uncertain depends on the parameter $\sigma_a$, see FIG. 6. Thereby, the trade-off between risk and time efficiency, here illustrated by number of collisions and crossing time, can be controlled by tuning the value of $\sigma_a$.

Figure 7:
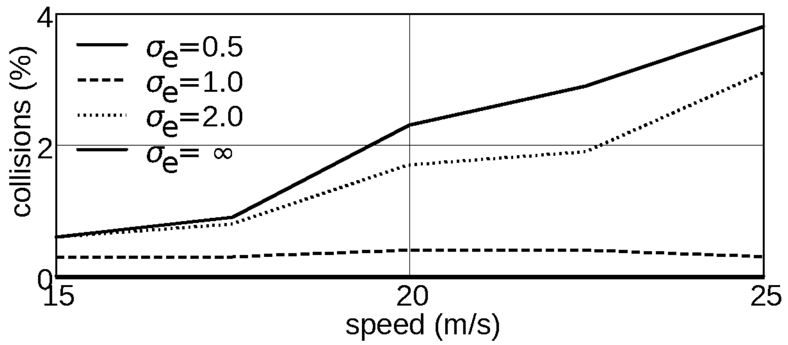
FIGS. 7 and 8 are plots of the percentage of collisions and timeouts, respectively, as a function of vehicle speed in simulated driving situations outside the training distribution (training distribution: $v \le 15$ m/s), for four different values of the threshold $\sigma_e$ on the epistemic uncertainty.
Figure 8:
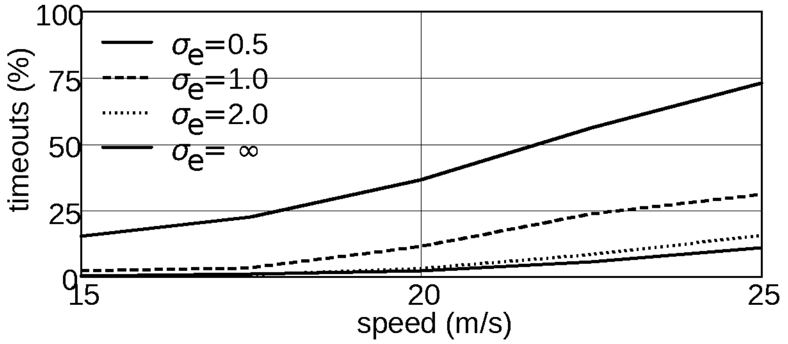

The performance of the epistemic uncertainty estimation of the EQN agent is illustrated in FIGS. 7-8, where the speed of the surrounding vehicles is increased. A sufficiently strict epistemic uncertainty criterion, i.e., sufficiently low value of the parameter $\sigma_e$, prevents the number of collisions to increase when the speed of the surrounding vehicles grows. The result at 15 m/s also indicates that the number of collisions within the training distribution is somewhat reduced when the epistemic uncertainty condition is applied. Interestingly, when combining moderate aleatoric and epistemic uncertainty criteria, by setting $\sigma_a$=1.5 and $\sigma_e$=1.0, all the collisions within the training distribution are removed, see Table 2. These results show that it is useful to consider the epistemic uncertainty even within the training distribution, where the detection of uncertain situations can prevent collisions in rare edge cases.

Figure 6:
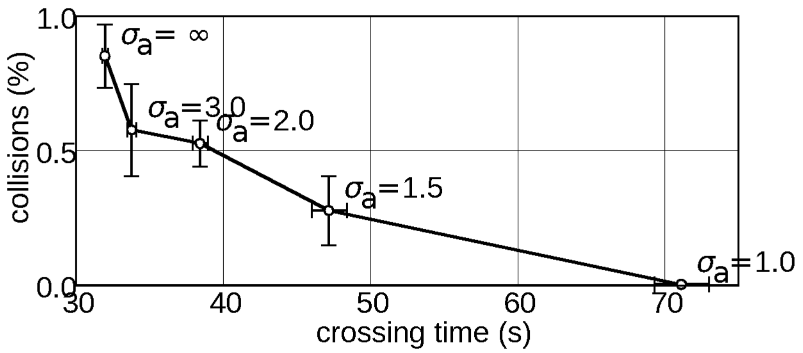
FIG. 6 is a plot of the percentage of collisions vs crossing time for an EQN algorithm, wherein the threshold $\sigma_a$ on the aleatoric threshold is varied.

The results demonstrate that the EQN agent combines the advantages of the individual components and provides a full uncertainty estimate, including both the aleatoric and epistemic dimensions. The aleatoric uncertainty estimate given by the EQN algorithm can be used to balance risk and time efficiency, by applying the aleatoric uncertainty criterion (varying the allowed variance $$\sigma_a^2,$$

see FIG. 6). An important advantage of the uncertainty criterion approach is that its parameter $\sigma_a$ can be tuned after the training process has been completed. An alternative to estimating the distribution over returns and still consider aleatoric risk in the decision-making is to adapt the reward function. Risk-sensitivity could be achieved by, for example, increasing the size of the negative reward for collisions. However, rewards with different orders of magnitude create numerical problems, which can disrupt the training process. Furthermore, for a complex reward function, it would be non-trivial to balance the different components to achieve the desired result.

The epistemic uncertainty information provides insight into how far a situation is from the training distribution. In this disclosure, the usefulness of an epistemic uncertainty estimate is demonstrated by increasing the safety, through classifying the agent's decisions in situations far from the training distribution as unsafe and then instead applying a backup policy. Whether it is possible to formally guarantee safety with a learning-based method is an open question, and likely an underlying safety layer is required in a real-world application. The EQN agent can reduce the activation frequency of such a safety layer, but possibly even more importantly, the epistemic uncertainty information could be used to guide the training process to regions of the state space in which the current agent requires more training. Furthermore, if an agent is trained in a simulated world and then deployed in the real world, the epistemic uncertainty information can identify situations with high uncertainty, which should be added to the simulated world.

The algorithms that were introduced in the present disclosure include a few hyperparameters, whose values need to be set appropriately. The aleatoric and epistemic uncertainty criteria parameters, $\sigma_a$ and $\sigma_e$, can both be tuned after the training is completed and allow a trade-off between risk and time efficiency, see FIGS. 6-8. Note that both these parameters determine the allowed spread in returns, between quantiles or ensemble members, which means that the size of these parameters are closely connected to the magnitude of the reward function. In order to detect situations with high epistemic uncertainty, a sufficiently large spread between the ensemble members is required, which is controlled by the scaling factor $\beta$ and the number of ensemble members K. The choice of $\beta$ scales with the magnitude of the reward function. A too small parameter value creates a small spread, which makes it difficult to classify situations outside the training distribution as uncertain. On the other hand, a too large value of $\beta$ makes it difficult for the trainable network to adapt to the fixed prior network. Furthermore, while an increased number of ensemble members K certainly improves the accuracy of the epistemic uncertainty estimate, it also induces a higher computational cost.

Specific Embodiments

After summarizing the theoretical concepts underlying the invention and empirical results confirming their effects, specific embodiments of the present invention will now be described.

FIG. 1 is a flowchart of a method 100 of controlling an autonomous vehicle using an RL agent.

Figure 3:
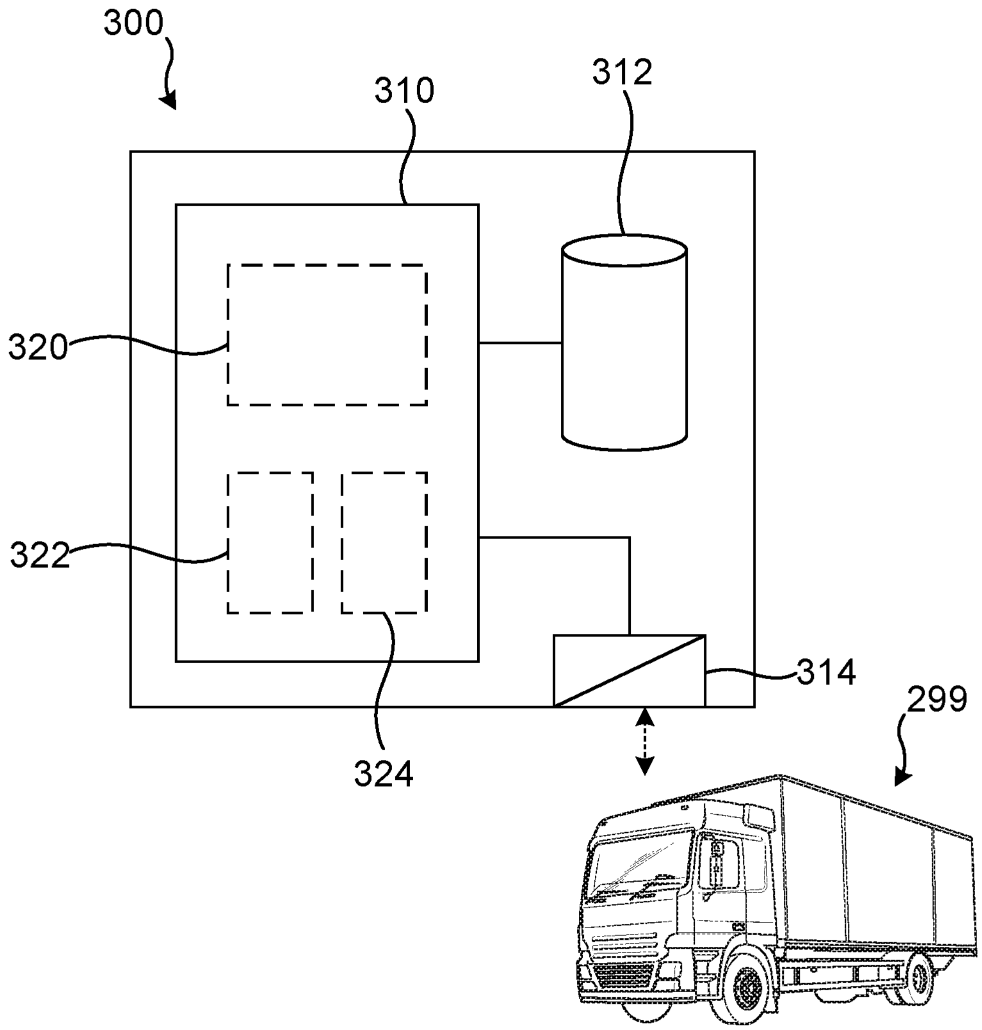
FIGS. 3 and 4 are block diagrams of arrangements for controlling an autonomous vehicle, according to embodiments of the invention.

The method 100 may be implemented by an arrangement 300 of the type illustrated in FIG. 3, which is adapted for controlling an autonomous vehicle 299. The autonomous vehicle 299 may be any road vehicle or vehicle combination, including trucks, buses, construction equipment, mining equipment and other heavy equipment operating in public or non-public traffic. The arrangement 300 may be provided, at last partially, in the autonomous vehicle 299. The arrangement 300, or portions thereof, may alternatively be provided as part of a stationary or mobile controller (not shown), which communicates with the vehicle 299 wirelessly. The arrangement 300 includes processing circuitry 310, a memory 312 and a vehicle control interface 314. The vehicle control interface 314 is configured to control the autonomous vehicle 299 by transmitting wired or wireless signals, directly or via intermediary components, to actuators (not shown) in the vehicle. In a similar fashion, the vehicle control interface 314 may receive signals from physical sensors (not shown) in the vehicle so as to detect current conditions of the driving environment or internal states prevailing in the vehicle 299. The processing circuitry 310 implements an RL agent 320 and two uncertainty estimators 322, 324 which are responsible, respectively, for the first uncertainty estimation and second uncertainty estimations described above. The outcome of the uncertainty estimations is utilized by the vehicle control interface 314 which is configured to control the autonomous vehicle 299 by executing the at least one tentative decision in dependence of the estimated first and/or second uncertainties, as will be understood from the following description of the method 100.

The method 100 begins with a plurality of training sessions 110-1, 110-2, . . . , 110-K (K≥2), which may preferably be carried out in a simultaneous or at least time-overlapping fashion. In particular, each of the K training sessions may use a different neural network initiated with an independently sampled set of weights (initial value), see Algorithm 3. Each neural network may implicitly estimate a quantile of the return distribution. In a training session, the RL agent interacts with an environment which includes the autonomous vehicle (or, if the environment is simulated, a model of the vehicle). The environment may further include the surrounding traffic (or a model thereof). The $k^{th}$ training session returns a state-action quantile function $$Z_{k,\tau}(s,a) = F^{-1}_{Z_k(s,a)}(\tau),$$

where 1≤k≤K. The function $k_{k,\tau}(s, a)$ refers to the quantiles of the distribution over returns. From the state-action quantile function, a state-action value function $Q_k$ (s, a) may be derived, and from the state-action value function, in turn, a decision-making policy may be derived in the manner described above.

A next step of the method 100 includes decision-making 112, in which the RL agent outputs at least one tentative decision ($\hat{s}$, $\hat{a}_l$), 1≤l≤L with L≥1, relating to control of the autonomous vehicle. The decision-making may be based on a central tendency of the K neural networks, such as the mean of the state-action value functions:

$$\bar{Q}(s,a) = \frac{1}{K}\sum_{k=1}^{K} Q_k(s,a).$$

Alternatively, the decision-making is based on the sample-based estimate $\tilde{\pi}(s)$ of the optimal policy, as introduced above.

There follows a first uncertainty estimation step 114, which is carried out on the basis of a variability measure $\mathrm{Var}_\tau[\mathbb{E}_k[Z_{k,\tau}(s, a)]]$. As the index τ indicates, the variability captures the variation with respect to quantile τ. It is the variability of an average $\mathbb{E}_k[Z_{k,\tau}(s, a)]$ of the plurality of state-action quantile functions evaluated for at least one a state-action pair ($\hat{s}$, $\hat{a}_l$) corresponding to the tentative decision that is estimated. The average may be computed as follows:

$$\mathbb{E}_k[Z_{k,\tau}(s,a)] = \frac{1}{K}\sum_{k=1}^{K} Z_{k,\tau}(s,a).$$

The method 100 further comprises a second uncertainty estimation step 116 on the basis of a variability measure $\mathrm{Var}_k[\mathbb{E}_\tau[Z_{k,\tau}(s, a)]]$. As indicated by the index k, the estimation targets the variability among ensemble members (ensemble variability), i.e., among the state-action quantile functions which result from the K training sessions when evaluated for a state-action pairs ($\hat{s}$, $\hat{a}_l$) corresponding to the one or more tentative decisions. More precisely, the variability of an expected value with respect to the quantile variable τ is estimated. Particular embodiments may use, rather than $\mathbb{E}_\tau[Z_{k,\tau}(s, a)]$, an approximation $\mathbb{E}_{\tau_\sigma}[Z_{k,\tau}(s, a)]$ taken over a finite point set $$\tau_\sigma = \left\{\frac{i}{K_\tau} : i \in [1, K_\tau]\right\}.$$

The method then continues to vehicle control 118, wherein the at least one tentative decision ($\hat{s}$, $\hat{a}_l$) is executed in dependence of the first and/or second estimated uncertainties. For example, step 118 may apply a rule by which the decision ($\hat{s}$, $\hat{a}_l$) is executed only if the condition $$\mathrm{Var}_\tau[\mathbb{E}_k[Z_{k,\tau}(\hat{s}, \hat{a}_l)]] < \sigma_a^2$$

is true, where $\sigma_a$ reflects an acceptable aleatoric uncertainty. Alternatively, the rule may stipulate that the decision ($\hat{s}$, $\hat{a}_l$) is executed only if the condition $$\mathrm{Var}_k[\mathbb{E}_\tau[Z_{k,\tau}(\hat{s}, \hat{a}_l)]] < \sigma_e^2$$

is true, where $\sigma_e$ reflects an acceptable epistemic uncertainty. Further alternatively, the rule may require the verification of both these conditions to release decision ($\hat{s}$, $\hat{a}_l$) for execution; this relates to a combined aleatoric and epistemic uncertainty. Each of these formulations of the rule serves to inhibit execution of uncertain decisions, which tend to be unsafe decisions, and is therefore in the interest of road safety.

While the method 100 in the embodiment described hitherto may be said to quantize the estimated uncertainty into a binary variable—it passes or fails the uncertainty criterion—other embodiments may treat the estimated uncertainty as a continuous variable. The continuous variable may indicate how much additional safety measures need to be applied to achieve a desired safety standard. For example, a moderately elevated uncertainty may trigger the enforcement of a maximum speed limit or maximum traffic density limit, or else the tentative decision shall not be considered safe to execute.

In one embodiment, where the decision-making step 112 produces multiple tentative decisions by the RL agent (L≥2), the tentative decisions are ordered in some sequence and evaluated with respect to their estimated uncertainties. The method may apply a rule that the first tentative decision in the sequence which is found to have an estimated uncertainty below the predefined threshold shall be executed. While this may imply that a tentative decision which is located late in the sequence is not executed even though its estimated uncertainty is below the predefined threshold, this remains one of several possible ways in which the tentative decisions can be "executed in dependence of" the estimated uncertainties in the sense of the claims. An advantage with this embodiment is that an executable tentative decision is found without having to evaluate all available tentative decision with respect to uncertainty.

In a further development of the preceding embodiment, a backup (or fallback) decision is executed if the sequential evaluation does not return a tentative decision to be executed. For example, if the last tentative decision in the sequence is found to have too large uncertainty, the backup decision is executed. The backup decision may be safety-oriented, which benefits road safety. At least in tactical decision-making, the backup decision may include taking no action. To illustrate, if all tentative decisions achieving an overtaking of a slow vehicle ahead are found to be too uncertain, the backup decision may be to not overtake the slow vehicle. The backup decision may be derived from a predefined backup policy $\pi_{backup}$, e.g., by evaluating the backup policy for the state $\hat{s}$.

Figure 2:
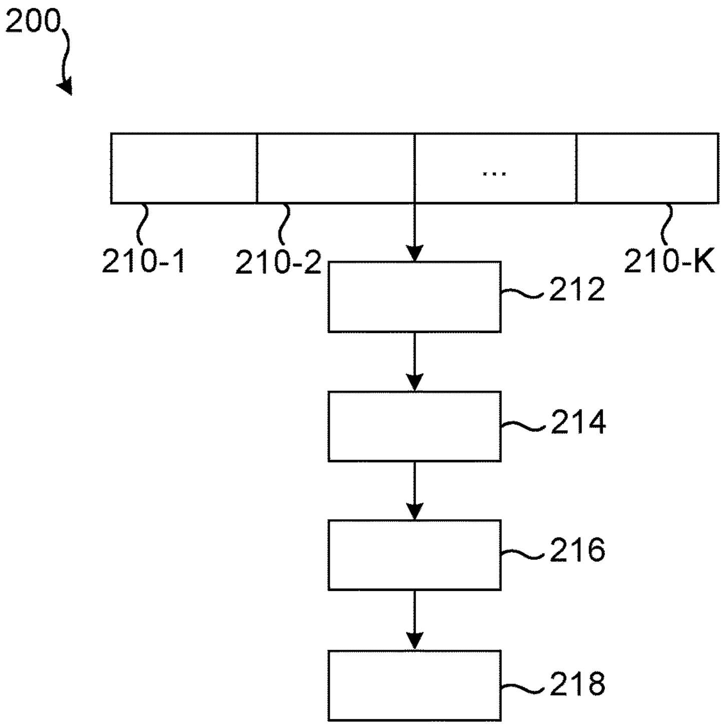

FIG. 2 is a flowchart of a method 200 for providing an RL agent for decision-making to be used in controlling an autonomous vehicle. Conceptually, an intermediate goal of the method 200 is to determine a training set $\mathcal{S}_B$ of those states for which the RL agent will benefit most from additional training:

$$\mathcal{S}_B=\{s\in\mathcal{S}: \text{RL agent not confident for some } a\in\mathcal{A}|_s\},$$

where $\mathcal{A}|_s$ is the set of possible actions in state s and the property "confident" was defined above. The thresholds $\sigma_a,\sigma_e$ appearing in the definition of "confident" represent a desired safety level at which the autonomous vehicle is to be operated. The thresholds may have been determined or calibrated by traffic testing and may be based on the frequency of decisions deemed erroneous, of collisions, near-collisions, road departures and the like. A possible alternative is to set the thresholds $\sigma_a,\sigma_e$ dynamically, e.g., in such manner that a predefined percentage of the state-action pairs will have an increased exposure during the additional training.

Figure 4:
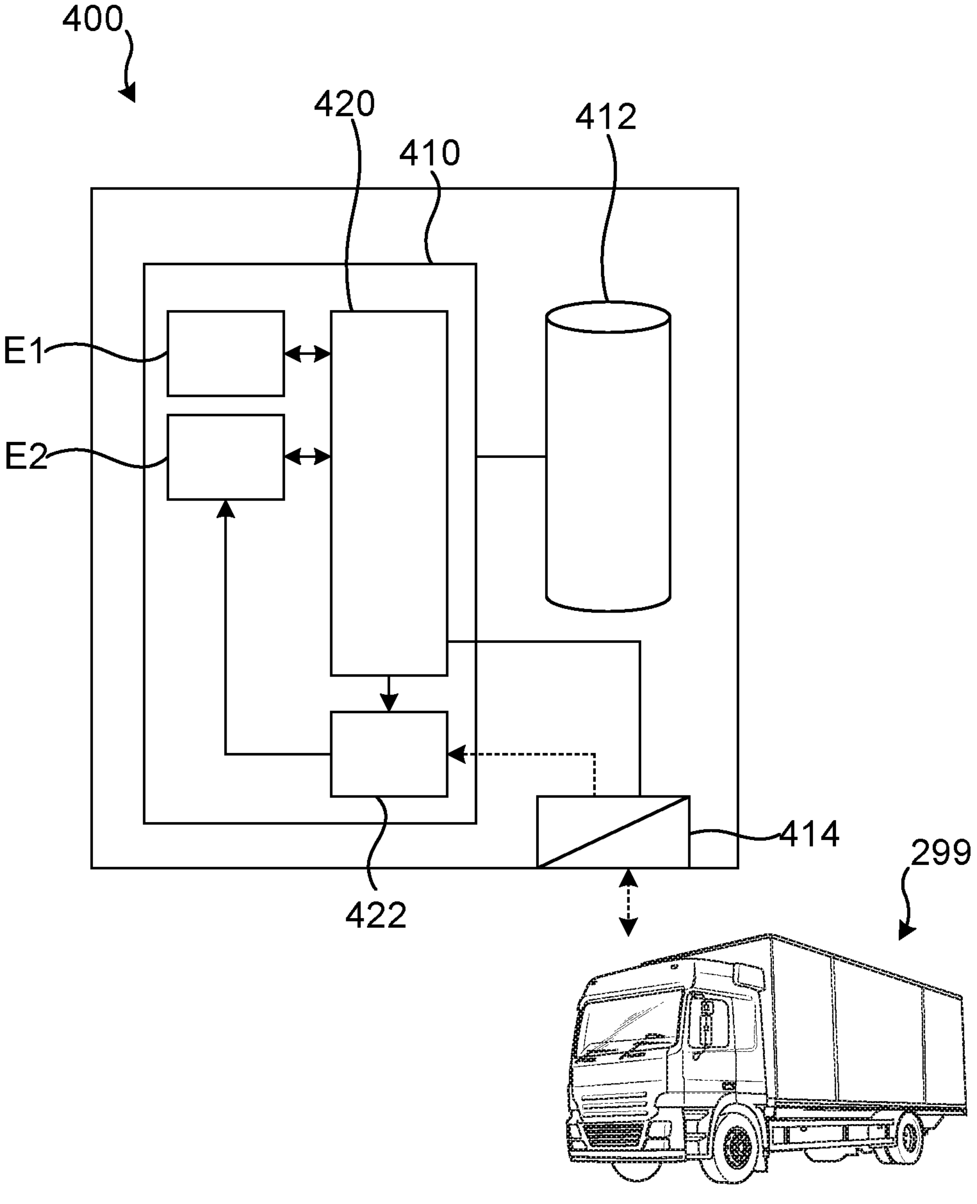

The method 200 may be implemented by an arrangement 400 of the type illustrated in FIG. 4, which is adapted for controlling an autonomous vehicle 299. General reference is made to the above description of the arrangement 300 shown in FIG. 3, which is similar in many respect to the arrangement 400 in FIG. 4. The processing circuitry 410 of the arrangement 400 implements an RL agent 420, a training manager 422 and at least two environments E1, E2, where the second environment E2 provides more intense exposure to the training set $\mathcal{S}_B$. The training manager 422 is configured, inter alia, to perform the first and second uncertainty estimations described above.

The method 200 begins with a plurality of training sessions 210-1, 210-2, . . . , 210-K (K≥2), which may preferably be carried out in a simultaneous or at least time-overlapping fashion. In particular, each of the K training sessions may use a different neural network initiated with an independently sampled set of weights (initial value), see Algorithm 3. Each neural network may implicitly estimate a quantile of the return distribution. In a training session, the RL agent interacts with an environment E1 which includes the autonomous vehicle (or, if the environment is simulated, a model of the vehicle). The environment may further include the surrounding traffic (or a model thereof). The $k^{th}$ training session returns a state-action quantile function $$Z_{k,\tau}(s,a)=F^{-1}_{Z_k(s,a)}(\tau),$$

where 1≤k≤K. Each of the functions $Z_{k,\tau}(s, a)$ refer to the quantiles of the distribution over returns. From the state-action quantile function, a state-action value function $Q_k(s, a)$ may be derived, and from the state-action value function, in turn, a decision-making policy may be derived in the manner described above.

To determine the need for additional training, the disclosed method 200 includes a first 214 and a second 216 uncertainty evaluation of at least some of the RL agent's possible decisions, which can be represented as state-action pairs (s, a). One option is to perform a full uncertainty evaluation including also state-action pairs with a relatively low incidence in real traffic. The first uncertainty evaluation 214 includes computing the variability measure $\mathrm{Var}_\tau[\mathbb{E}_k[Z_{k,\tau}(s, a)]]$ or an approximation thereof, as described in connection with step 114 of method 100 above. The second uncertainty evaluation 216 includes computing the variability measure $\mathrm{Var}_k[\mathbb{E}_\tau[Z_{k,\tau}(s, a)]]$ or an approximation thereof, similar to step 116 of method 100.

The method 200 then concludes with an additional training stage 218, in which the RL agent interacts with a second environment E2 including the autonomous vehicle, wherein the second environment differs from the first environment E1 by an increased exposure to $\mathcal{S}_B$.

In some embodiments, the uncertainty evaluations 214, 216 are partial. To this end, more precisely, an optional traffic sampling step 212 is be performed prior to the uncertainty evaluations 214, 216. During the traffic sampling 212, the state-action pairs that are encountered in the traffic are recorded as a set $\mathcal{S}_L$. Then, an approximate training set $\tilde{\mathcal{S}}_B=\mathcal{S}_B\cap\mathcal{S}_L$ may be generated by evaluating the uncertainties only for the elements of $\mathcal{S}_L$. The approximate training set $\tilde{\mathcal{S}}_B$ then replaces $\mathcal{S}_B$ in the additional training stage 218. To illustrate, Table 3 shows an uncertainty evaluation for the elements in an example $\tilde{\mathcal{S}}_B$ containing fifteen elements, where l is a sequence number.

TABLE 3

Example uncertainty evaluations

| l | $(S_l, a_l)$ | $\mathrm{Var}_\tau[\mathbb{E}_k[Z_{k,\tau}(s, a)]]$ | $\mathrm{Var}_k[\mathbb{E}_\tau[Z_{k,\tau}(s, a)]]$ |
|---|---|---|---|
| 1 | (S1, right) | 1.1 | 0.3 |
| 2 | (S1, remain) | 1.5 | 0.2 |
| 3 | (S1, left) | 44 | 2.2 |
| 4 | (S2, yes) | 0.5 | 0.0 |
| 5 | (S2, no) | 0.6 | 0.1 |
| 6 | (S3, A71) | 10.1 | 0.9 |
| 7 | (S3, A72) | 1.7 | 0.3 |
| 8 | (S3, A73) | 2.6 | 0.4 |
| 9 | (S3, A74) | 3.4 | 0.0 |
| 10 | (S3, A75) | 1.5 | 0.3 |
| 11 | (S3, A76) | 12.5 | 0.7 |
| 12 | (S3, A77) | 3.3 | 0.2 |
| 13 | (S4, stop) | 1.7 | 0.1 |
| 14 | (S4, cruise) | 0.2 | 0.0 |
| 15 | (S4, go) | 0.9 | 0.2 |

Here, the sets of possible actions for each state S1, S2, S3, S4 are not known. If it is assumed that the enumeration of state-action pairs for each state is exhaustive, then $\mathcal{A}|_{S1}$=fright, remain, left), $\mathcal{A}|_{S2}$={yes, no}, $\mathcal{A}|_{S3}$={A71, A72, A73, A74, A75, A76, A77} and $\mathcal{A}|_{S4}$={stop, cruise, go}. If the enumeration is not exhaustive, then {right, remain, left}$\subset\mathcal{A}|_{S1}$, {yes, no}$\subset\mathcal{A}|_{S2}$ and so forth. For an example value of the threshold $$\sigma_a^2=4.0$$

(applied to the third column), all elements but l=3, 6, 11 pass. If an example threshold $$\sigma_e^2=1.0$$

is enforced (applied to the fourth column), then all elements but l=3 pass. Element l=3 corresponds to state S1, and elements l=6,11 correspond to state S3. On this basis, if the training set $\hat{\mathcal{S}}_B$ is defined as all states for which at least one action belongs to a state-action pair with an epistemic uncertainty exceeding the threshold, one obtains $\hat{\mathcal{S}}_B=\{S1\}$. Alternatively, if the training set is all states for which at least one action belongs to a state-action pair with an aleatoric and/or epistemic uncertainty exceeding the threshold, then $\hat{\mathcal{S}}_B=\{S1, S3\}$. This will be the emphasis of the additional training 218.

In still other embodiments of the method 200, the training set $\mathcal{S}_B$ may be taken to include all states $s\in\mathcal{S}$ for which the mean epistemic variability of the possible actions $\mathcal{A}|_s$ exceeds the threshold $$\sigma_e^2.$$

This may be a proper choice if it is deemed acceptable for the RL agent to have minor points of uncertainty but that the bulk of its decisions are relatively reliable. Alternatively, the training set $\mathcal{S}_B$ may be taken to include all states $s\in\mathcal{S}$ for which the mean sum of aleatoric and epistemic variability of the possible actions $\mathcal{A}|_s$ exceeds the sum of the thresholds $$\sigma_a^2+\sigma_e^2.$$

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling actuators in an autonomous vehicle using a reinforcement learning, RL, agent, the method comprising:

- a plurality of training sessions, in which the RL agent interacts with an environment including the autonomous vehicle, wherein in each training session the environment has a different initial value, and wherein each training session individually yields a state-action quantile function dependent on state and action;
- decision-making, in which the RL agent outputs at least one tentative decision relating to control of the autonomous vehicle;
- a first uncertainty estimation on the basis of a variability measure, relating to a variability with respect to quantile, of an average of the plurality of state-action quantile functions evaluated for a state-action pair corresponding to the tentative decision;
- a second uncertainty estimation on the basis of a variability measure, relating to an ensemble variability, for the plurality of state-action quantile functions evaluated for a state-action pair corresponding to the tentative decision; and
- vehicle control, wherein the at least one tentative decision is executed in dependence of both of the first and second estimated uncertainties.

2. A method of providing a reinforcement learning, RL, agent for decision-making to be used in controlling an autonomous vehicle, the method comprising:

- a plurality of training sessions, in which the RL agent interacts with an environment including the autonomous vehicle, wherein in each training session the environment has a different initial value, and wherein each training session individually yields a state-action quantile function dependent on state and action;
- a first uncertainty estimation on the basis of a variability measure, relating to a variability with respect to quantile, of an average of the plurality of state-action quantile functions evaluated for state-action pairs corresponding to possible decisions by the trained RL agent;
- a second uncertainty estimation on the basis of a variability measure, relating to an ensemble variability, for the plurality of state-action quantile functions evaluated said state-action pairs; and
- additional training, in which the RL agent interacts with a second environment including the autonomous vehicle, wherein the second environment differs from the first environment by an increased exposure to a subset of state-action pairs for which the first and/or second estimated uncertainty is relatively higher.

3. The method of claim 1, wherein the RL agent includes at least one neural network.

4. The method of claim 1, wherein each of the training sessions employs an implicit quantile network, IQN, from which the RL agent is derivable.

5. The method of claim 4, wherein the initial value of a training session corresponds to a randomized prior function, RPF.

6. The method of claim 1, wherein the uncertainty estimations relate to a combined aleatoric and epistemic uncertainty.

7. The method of claim 1, wherein the variability measure used in the second uncertainty estimation is applied to sampled expected values of the respective state-action quantile functions.

8. The method of claim 1, wherein the variability measure is one or more of: a variance, a range, a deviation, a variation coefficient, an entropy.

9. The method of claim 1, wherein the tentative decision is executed only if the first and second estimated uncertainties are less than respective predefined thresholds.

10. The method of claim 9, wherein:

- the decision-making includes the RL agent outputting multiple tentative decisions; and
- the vehicle control includes sequential evaluation of the tentative decisions with respect to their estimated uncertainties.

11. The method of claim 10, wherein a backup decision, which is based on a backup policy, is executed if the sequential evaluation does not return a tentative decision to be executed.

12. The method of claim 1, wherein the decision-making includes tactical decision-making.

13. The method of claim 1, wherein the decision-making is based on a central tendency of weighted averages of the respective state-action quantile functions.

14. An arrangement for controlling actuators in an autonomous vehicle, comprising:

- processing circuitry and memory implementing a reinforcement learning, RL, agent configured to
  - interact with an environment including the autonomous vehicle in a plurality of training sessions, wherein in each training session the environment has a different initial value, and wherein each training session individually yields a state-action quantile function dependent on state and action, and output at least one tentative decision relating to control of the autonomous vehicle, the processing circuitry and memory further implementing a first uncertainty estimator and a second uncertainty estimator configured for a first uncertainty estimation on the basis of a variability measure, relating to a variability with respect to quantile τ, of an average of the plurality of state-action quantile functions evaluated for a state-action pair corresponding to the tentative decision, and a second uncertainty estimation on the basis of a variability measure, relating to an ensemble variability, for the plurality of state-action quantile functions evaluated for a state-action pair corresponding to the tentative decision, the arrangement further comprising a vehicle control interface configured to control the autonomous vehicle by executing the at least one tentative decision in dependence of both of the estimated first and second uncertainties.

15. An arrangement for controlling actuators in an autonomous vehicle, comprising:

processing circuitry and memory implementing a reinforcement learning, RL, agent configured to interact with a first environment including the autonomous vehicle in a plurality of training sessions, wherein in each training session the environment has a different initial value, and wherein each training session individually yields a state-action quantile function dependent on state and action, the processing circuitry and memory further implementing a training manager configured to perform a first uncertainty estimation on the basis of a variability measure, relating to a variability with respect to quantile τ, of an average of the plurality of state-action quantile functions evaluated for one or more state-action pairs corresponding to possible decisions by the trained RL agent, perform a second uncertainty estimation on the basis of a variability measure, relating to an ensemble variability, for the plurality of state-action quantile functions evaluated for said state-action pairs, and initiate additional training, in which the RL agent interacts with a second environment including the autonomous vehicle, wherein the second environment differs from the first environment by an increased exposure to a subset of state-action pairs for which the first and/or second estimated uncertainty is relatively higher.

* * * * *